(12) United States Patent
Thompson

(10) Patent No.: US 6,735,951 B2
(45) Date of Patent: May 18, 2004

(54) TURBOCHARGED AUXILIARY POWER UNIT WITH CONTROLLED HIGH SPEED SPOOL

(75) Inventor: Robert G. Thompson, San Diego, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 64 days.

(21) Appl. No.: 10/037,604

(22) Filed: Jan. 4, 2002

(65) Prior Publication Data
US 2003/0126864 A1 Jul. 10, 2003

(51) Int. Cl.⁷ .................................................. F02C 6/00
(52) U.S. Cl. ............................. 60/774; 60/791; 60/792
(58) Field of Search ........................... 60/791, 792, 774

(56) References Cited

U.S. PATENT DOCUMENTS

| | | | |
|---|---|---|---|
| 2,489,939 A | * 11/1949 | Traupel | 60/39.181 |
| 2,675,673 A | * 4/1954 | Mallinson et al. | 60/792 |
| 3,521,448 A | * 7/1970 | Amelio | 60/39.281 |
| 3,680,309 A | 8/1972 | Wallace, Jr. | |
| 4,091,613 A | 5/1978 | Young | |
| 4,132,064 A | * 1/1979 | Kumm | 60/786 |
| 4,684,081 A | 8/1987 | Cronin | |
| 4,893,466 A | * 1/1990 | Egnell et al. | 60/773 |
| 4,979,362 A | 12/1990 | Vershure, Jr. | |
| 5,032,028 A | 7/1991 | Riazuelo et al. | |
| 5,081,832 A | * 1/1992 | Mowill | 60/792 |
| 5,113,670 A | 5/1992 | McAuliffe et al. | |
| 5,160,069 A | 11/1992 | Klaass et al. | |
| 5,235,803 A | 8/1993 | Rodgers | |
| 5,310,311 A | 5/1994 | Andres et al. | |
| 5,313,779 A | 5/1994 | Rodgers | |
| 5,385,011 A | 1/1995 | Stewart, Jr. | |
| 5,485,717 A | 1/1996 | Williams | |
| 5,594,322 A | 1/1997 | Rozman et al. | |
| 5,634,723 A | 6/1997 | Agrawal | |
| 5,635,768 A | 6/1997 | Birch et al. | |
| 5,687,563 A | 11/1997 | Thompson, Jr. | |
| 5,722,229 A | 3/1998 | Provost | |
| 5,813,630 A | 9/1998 | Williams | |
| 5,899,411 A | 5/1999 | Latos et al. | |
| 5,903,116 A | 5/1999 | Geis et al. | |

(List continued on next page.)

Primary Examiner—Justine R. Yu
Assistant Examiner—William H. Rodriguez
(74) Attorney, Agent, or Firm—Carlson, Gaskey & Olds

(57) ABSTRACT

An APU system includes a gas turbine engine having a low pressure spool, a high pressure spool and an electrical generator. The electrical generator is driven by the high pressure spool which is governed to a constant speed. Conversely, the low pressure spool is not governed at all, but is allowed to seek a speed that balances the power developed by the low pressure turbine (LPT) and power absorbed by the low pressure compressor (LPC). A step increase/decrease in electrical power demand is met with a step increase/decrease in fuel flow, which results in an overshoot/undershoot of the new equilibrium turbine inlet temperature TIT. The TIT returns to the new equilibrium when the LP spool has achieved it's new shaft speed and new equilibrium power balance. The HP Spool and generator maintain essentially constant speed and frequency, while the LP Spool responds to restore equilibrium. The APU's response to sudden power change is thereby effectively immediate as the power change is decoupled from the large mechanical inertia of the HP and LP spools.

15 Claims, 2 Drawing Sheets

U.S. PATENT DOCUMENTS

| | | |
|---|---|---|
| 5,921,683 A | 7/1999 | Merritt et al. |
| 5,934,063 A | 8/1999 | Nakhamkin |
| 5,977,645 A | 11/1999 | Glennon |
| 6,101,806 A | 8/2000 | Chen et al. |
| 6,106,229 A | 8/2000 | Nikkanen et al. |
| 6,124,646 A | 9/2000 | Artinian et al. |
| 6,242,881 B1 | 6/2001 | Giordano |
| 6,278,262 B1 | 8/2001 | Ullyott |
| 6,281,595 B1 | 8/2001 | Sinha et al. |
| 6,283,410 B1 | 9/2001 | Thompson |

* cited by examiner

TURBOCHARGED AUXILIARY POWER UNIT WITH CONTROLLED HIGH SPEED SPOOL

BACKGROUND OF THE INVENTION

The present invention relates to an auxiliary power unit, and more particularly to a multi-spool auxiliary power unit having a governed high-speed spool, which drives a generator at a constant speed to provide consistent electrical power under variable load conditions.

An auxiliary power unit (APU) system provides auxiliary and/or emergency power to one or more aircraft loads. In conventional APU systems, a dedicated starter motor is operated during a starting sequence to bring a gas turbine engine up to self-sustaining speed, following which the engine is accelerated to operating speed. Once this condition is reached, a generator is coupled to and driven by the gas turbine engine during operation whereupon the generator develops electrical power.

The APU must provide constant electric power over the full range of flight speed, altitudes, ambient temperatures and other conditions. Constant mechanical/electric power requirement typically drives the APU thermodynamic power to large values at high altitudes, which requires relatively large aerodynamic components. The components size, weight and fuel burn are minimized by running more than one spool to higher than usual APU cycle pressure ratio.

In conventional multi-spool APUs, the generator is located on the low-pressure (LP) spool, along with the load compressor. This arrangement is vulnerable to spool speed and generator frequency swings under transient electrical loads, i.e. instantaneous step-like off-loads and on-loads. The impact of such varying electrical loads results in varying shaft speed and varying net electric power output frequency. Variability of power output frequency more than +/−0.5% is considered a compromise of power quality.

Various attempts have been provided to govern the LP spool to a constant speed. However, it is difficult to maintain constant LP shaft speed and frequency under electrical step load changes of considerable magnitude as the high-pressure (HP) spool inertia slows the speed change needed to meet the load demand. The LP spool consequently tends to over-speed in off-load, and under-speed on load increase.

Accordingly, it is desirable to provide an APU which provides consistent electrical power under variable load conditions such as instantaneous step-like electrical off-loads and on-loads.

SUMMARY OF THE INVENTION

The APU system according to the present invention provides a gas turbine engine having a low-pressure spool, a high-pressure spool and an electrical generator. The electrical generator is driven by the high-pressure spool. Preferably, the electrical generator is a starter generator which operates as a starter to spin up the high power spool to light-off the gas turbine engine.

A control valve is operated by a controller in response to the electrical loads currently powered by the generator to drive the high pressure spool at a constant speed. The high pressure spool is preferably driven at a constant speed to provide a specified generator frequency, such as 400 Hz. With the high pressure spool governed at the constant speed, generator step load changes are met by sharply changing the fuel flow only—which is very nimble.

Conversely, the low pressure spool is not governed at all, but is allowed to seek a speed that balances the power developed by the low pressure turbine (LPT) and power absorbed by the low pressure compressor (LPC). The low pressure spool shaft speed increases on increasing power demand, and decreases on reduced power demand. The spool has significant mechanical inertia and time is needed to achieve the high pressure spool power balance.

Generally, at lower altitudes the high pressure turbine inlet temperature (TIT) is relatively low, causing the low pressure spool to run relatively slower. At higher altitudes the ambient air pressure and density fall causing the TIT to be driven upward to maintain the high pressure spool shaft speed at given generator load. Concurrently, extra energy in the hot expansion gas drives the low pressure spool faster, which increases the airflow and APU power, until LP speed, airflow, fuel flow and generator power are balanced. Thus, by pumping more air at increasing shaft speed the low pressure spool flattens out the TIT increase requirement by increasing the airflow. That is, as power generated by the spool is essentially airflow rate flow multiplied by TIT, an increase in airflow rate results in a decreased requirement for an increase in TIT.

In operation, a step increase/decrease in electrical power demand is met with a step increase/decrease in fuel flow, which results in an overshoot/undershoot of the new equilibrium TIT. The TIT is restored to the new equilibrium when the LP spool has achieved its new shaft speed and new equilibrium power balance. The HP spool and generator maintain essentially constant speed and frequency, while the LP spool responds in a following manner to restore equilibrium. The APU's response to sudden power change is thereby effectively immediate as the power change is decoupled from the large mechanical inertia of the HP and LP spools.

The present invention therefore provides consistent electrical power under variable load conditions such as instantaneous step-like electrical off-loads and on-loads.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
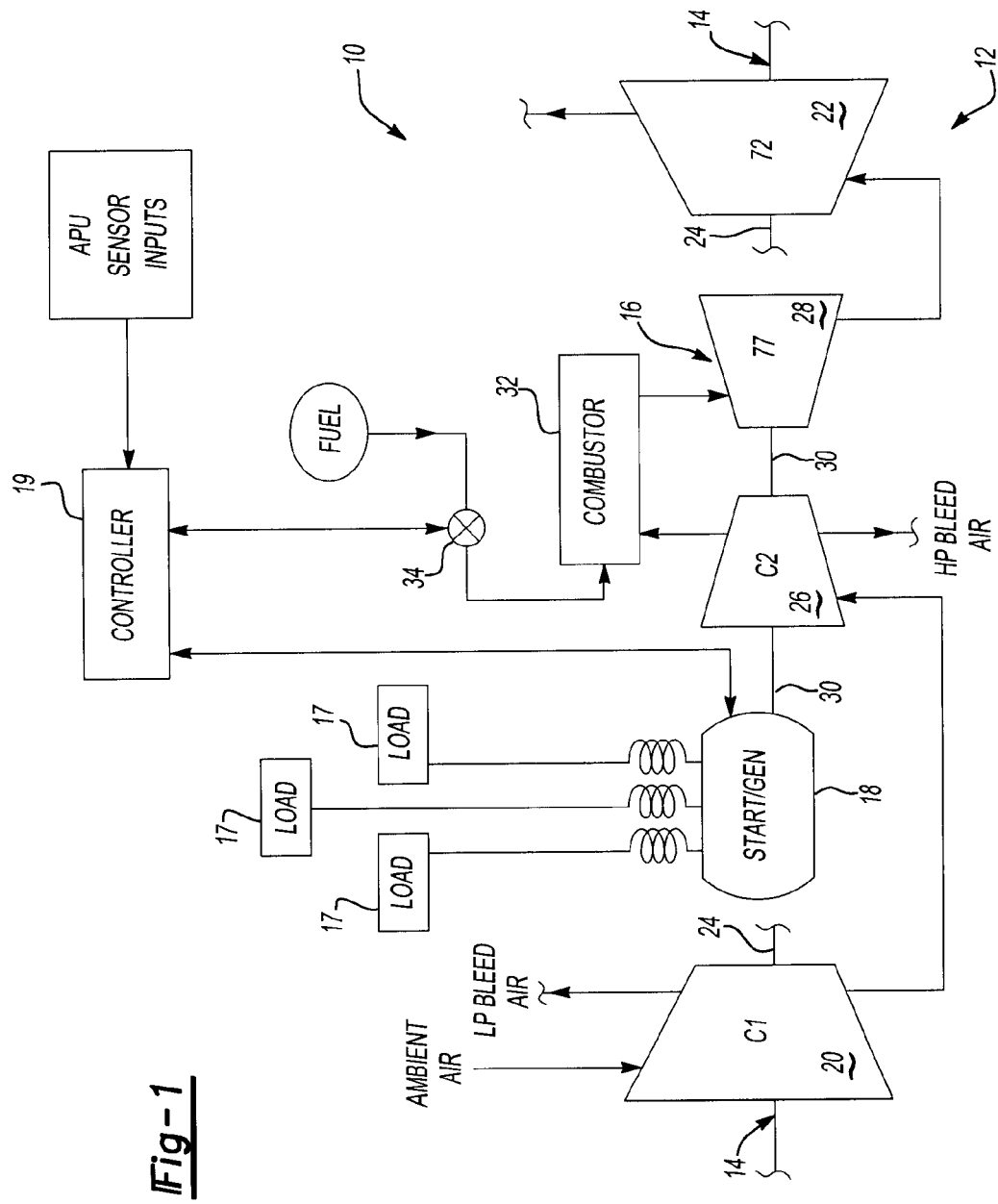
FIG. 1 is a schematic block diagram of an auxiliary power unit according to the present invention.

FIG. 1 illustrates a general schematic view of an auxiliary power unit (APU) 10 according to the present invention. The APU 10 generally includes a gas turbine engine 12 having a low pressure spool 14, a high pressure spool 16 and an electrical generator 18. It should be understood that other power supplies an other non-aircraft applications will also benefit from the present invention.

The electrical generator 18 is driven by the high pressure spool 16. Preferably, the electrical generator 18 is a starter generator which operates as a starter to spin up the high pressure spool to light-off the gas turbine engine 12. The electrical generator 18 powers a multiple of electrical loads (illustrated schematically at 17) and communicates with a controller 19. The controller 19 preferably receives a multiple of sensor inputs such as spool speed, fuel flow, applied electrical load, and the like and may be implemented in a microprocessor based electronic system (either digital or analog).

The low pressure spool 14 includes a low pressure compressor (LPC) 20 and a low pressure turbine (LPT) 22 rotatably connected by a common shaft (illustrated schematically at 24.) The high pressure spool 16 includes a high pressure compressor (HPC) 26 and a high pressure turbine (HPT) 28 rotatably connected by a common shaft (illustrated schematically at 30.) Although a particular spool arrangement is illustrated in the disclosed embodiment, other arrangements will also benefit from the present invention, e.g., the LPC and HPT may be located at opposite ends of the APU, with shafting concentric with the HP Spool, or the LPC may be located at the HPT end of the APU, avoiding concentric shafting.

In operation, the LPC 20 receives ambient air and compresses it to moderate pressure. The HPC 26 receives the cycle air from the LPC 20 and compresses it to a desired maximum cycle pressure ratio on the order of 15<PR<20 for engines in the 1500 hp to 3000 hp class. Bleed air may be drawn from the discharge of the LPC 20 and/or the HPC 26 for other uses. Cycle air exiting the HPC 26 is communicated to a combustor 32 and is burned with fuel as known. Fuel is provided to the combustor 32 in a controlled manner through a control valve 34 or the like. Preferably, the control valve 34 is operated by the controller 19 in response to the electrical loads 17 currently powered by the generator 18 to drive the high pressure spool at a constant speed as will be further described.

The heated cycle air from the combustor 32 is communicated to and expanded through the HPT 28. Power generated by the HPT 28 drives the HPC 26 through the common shaft 30. Preferably, the common shaft 30 directly drives the generator 18, however, other arrangements such as a gearbox driven generator will also benefit from the present invention. Hot gas exiting the HPT 28 is then expands through the LPT 22 such that the low pressure spool 14 is driven at a variable speed. That is, the speed of the low pressure spool 14 "floats" to an ungoverned speed depending on the cycle variables that produces the net power balance between the LPC 20 and LPT 22.

Figure 2:
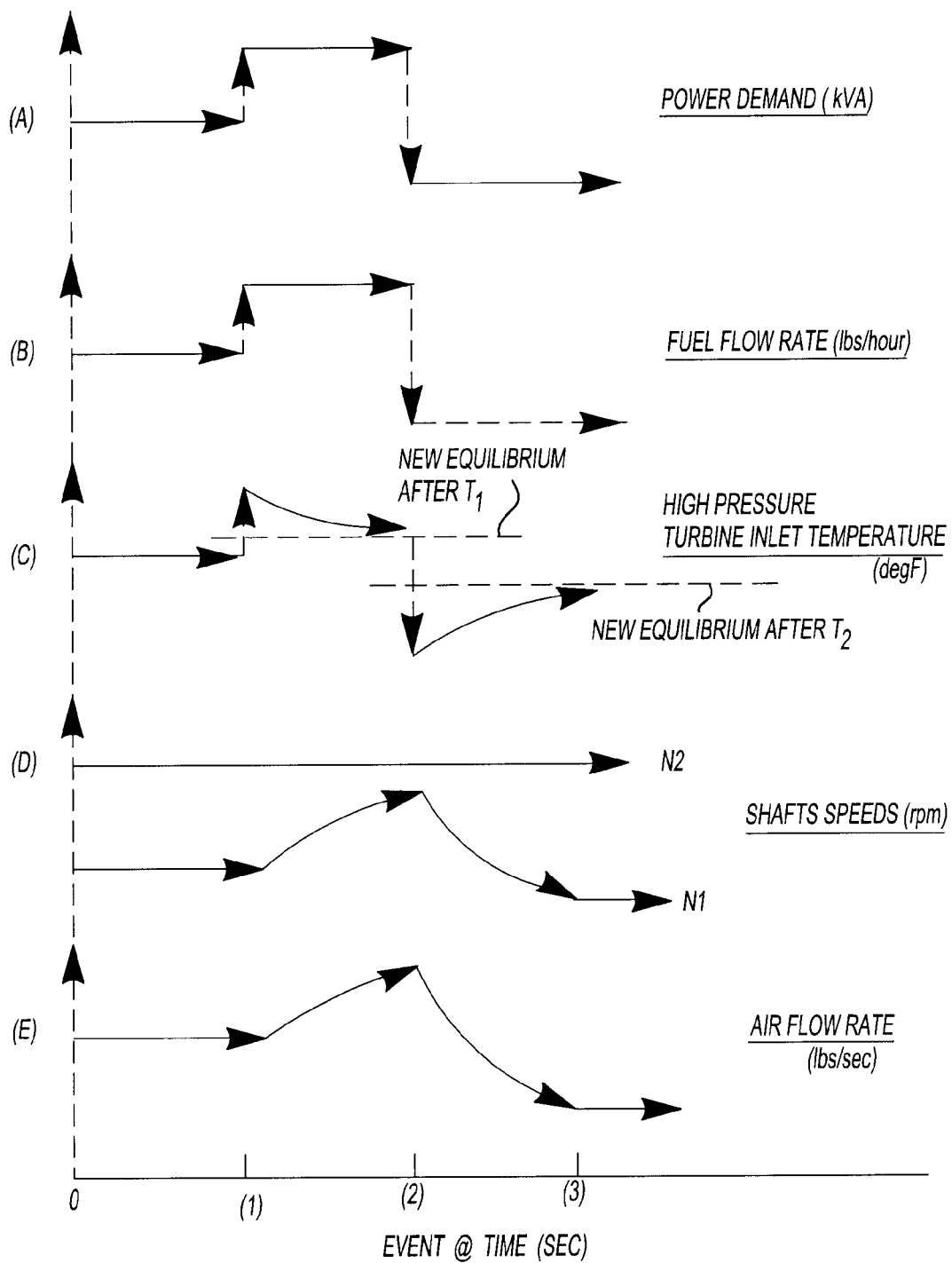
FIG. 2 is a graphical representation of the response characteristics of the auxiliary power illustrated in FIG. 1.

Referring to FIG. 2, the response behavior of the APU 10 to a sequence of electrical power demand events is graphically illustrated by an interrelated series of operational characteristic graphs. The high pressure spool 16 (shaft N2; graph D) is preferably driven at a constant speed and a specified generator power, such as 400 Hz. Conversely, the low pressure spool 14 (shaft N1; graph D) is not governed at all, but is allowed to seek the speed that balances the power developed by the LPT 20 and power absorbed by the LPC 20. The low pressure spool 14 (shaft N1; graph D) speed increases on increasing power demand, and decreases on reduced power demand. That is, the low pressure spool absorbs the difference when the high speed spool overshoots/undershoots the new equilibrizing TIT due to a change in fuel flow rate to maintain the high pressure spool at the desired constant speed.

A representative sequences of electrical power demands are graphed in graph A. The power demand is constant until time T1 where the power demand is suddenly increased, such as by switching on a representative electrical load 17 (FIG. 1). Notably, until time T1 all the APU 10 variables are balanced. The power demand is then maintained at the higher demand until time T2 where the power demand is suddenly decreased by twice the value of the load increase at time T1 such as by switching off a load twice the size of the load switched on at time T1. The power demand is then maintained at the lower demand from time T2 forward. As the power demand is typically an electrical load, the load changes are typically fractions of the system capacity and step-on and step-off to be virtually instantaneous. Although the loads are applied and removed in the step-like function of graph A, other loads schedules will also benefit from the present invention.

In response to a change in power demand at time T1, fuel flow rate is increased in a nearly instantaneous manner such that the fuel flow rate profile (graph B) closely follows the power demand profile (graph A). Preferably, the controller 19 (FIG. 1) identifies any minute change (less than 0.1%) in the high speed spool 16 (Shaft N2, graph D) such that fuel flow rate is immediately adjusted to maintain the high pressure spool 16 at a desired constant speed. The ability to respond quickly to power change is enhanced by minimizing N2 speed change. With the high pressure spool 16 governed at constant speed, a generator step load change is met by sharply changing the fuel flow only—which is very nimble.

There is initially no speed change in the low pressure spool (shaft N1; graph D) as the generator 18 (FIG. 1) receives an increase in power to meet the increased load (applied at time T1) by a sufficiently large TIT increase only. Turbine inlet temperature (graph C) responds almost as quickly as the fuel flow rate at event T1.

Immediately following the fuel flow increase at time T1, the low pressure spool (shaft N1; graph D) accelerates, as the LPT 22 (FIG. 1) receives an inlet temperature increase from the HPT 28. The low pressure spool continues to accelerate from time T1 to time T2 (graph D), pumping more air to the high pressure spool (graph E), which drives the high pressure turbine TIT down (time T1 to T2; graph C), until the low pressure spool speed achieves equilibrium. The low pressure spool (shaft N1; graph D) speed increase creates increased pressure and air flow to the high pressure spool (shaft N2; graph D), reducing the demand for TIT to maintain constant high pressure spool (shaft N2; graph D) speed at a given power demand. Neglecting cycle efficiency, the fuel flow stays relatively constant during the stabilization process. TIT therefore overshoots (time T1; graph C) on increasing power demand and undershoots (time T2; graph C) on decreasing demand, until the low pressure spool speed and system pressures, temperatures and airflow have all stabilized.

As with the sudden electrical load increase at time T1, the sudden load decrease at time T2 is sensed by identifying that the high pressure spool N2 speed is rising away from the desired constant speed. Fuel flow is then accordingly dropped to maintain (time T2) the high pressure spool at the desired constant speed. The low pressure spool (shaft N1) slows to equilibrium (time T2 to time T3; graph D) and TIT rises to its new equilibrium after undershooting at time T2. By time T3, the system has stabilized at the final steady state power.

Generally then, a step increase/decrease in power is met with a step increase/decrease in fuel flow, which results in an overshoot/undershoot of the new high speed spool equilibrium TIT. The TIT returns to the new equilibrium when the low pressure spool has achieved its new shaft speed and equilibrium power balance. The high pressure spool (shaft N2) and generator maintain essentially constant speed and frequency, while the low pressure spool responds to restore equilibrium after a fuel flow rate change. The APU's response to sudden power change is thereby effectively immediate as the power change is decoupled from the large mechanical inertia of the HP and LP spools.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of maintaining a nominally constant frequency electrical output from an electrical generator driven by a gas turbine engine comprising the steps of:
   (1) driving a fixed geometry high pressure spool at a constant speed;
   (2) driving a fixed geometry low pressure turbine of a low pressure spool by an axial high pressure turbine of said high pressure spool such that a speed of the low pressure spool varies relative to the constant speed of the high pressure spool; and
   (3) driving an electrical generator by said high pressure spool such that the electrical generator generates a specified output frequency.

2. A method as recited in claim 1, wherein said step (1) further comprises the steps of:
   sensing the speed of the high pressure spool; and
   governing the speed of the high pressure spool to maintain the constant speed.

3. A method as recited in claim 1, wherein said step (1) further comprises controlling a fuel flow to a combustor in communication with a high pressure turbine of the high pressure spool to maintain the fixed geometry high pressure spool at the constant speed.

4. A method as recited in claim 3, wherein said step (1) further comprises controlling the fuel flow to the combustor in response to an electrical power load to maintain the fixed geometry high pressure spool at the constant speed.

5. A method as recited in claim 3, wherein said step (2) further comprises floating a speed of the fixed geometry low pressure spool such that the speed of the low pressure spool balances the power developed by the low pressure turbine and the power absorbed by a low pressure compressor of the low pressure spool.

6. A method as recited in claim 1, wherein said step (1) further comprises:
   controlling a fuel flow rate in step increments to maintain the fixed geometry high pressure spool at the constant speed.

7. A method as recited in claim 1, wherein said step (1) further comprises:
   controlling a fuel flow rate in step increments in response to a step incremental change in an electrical power demand.

8. A method as recited in claim 1, wherein said step (2) further comprises
   driving the fixed geometry low pressure turbine with a fluid flow from the axial high pressure turbine.

9. A method of operating an auxiliary power unit comprising the steps of:
   (1) supplying fuel to a combustor in communication with an axial high pressure turbine of a fixed geometry high pressure spool;
   (2) adjusting the supply of fuel in said step (1) such that said high pressure spool is driven at a constant speed;
   (3) driving a low pressure turbine of a fixed geometry low pressure spool by said axial high pressure turbine such that a speed of the fixed geometry low speed spool balances the power developed by the low pressure turbine and the power absorbed by a low pressure compressor of the fixed geometry low pressure spool; and
   (4) driving an electrical generator by the fixed geometry high pressure spool such that the electrical generator generates a constant output frequency irrespective of an electrical load.

10. A method as recited in claim 9, further comprising the step of sensing the speed of the fixed geometry high pressure spool.

11. A method as recited in claim 10, further comprising the step of performing said step 2 in response to said sensing step.

12. A method as recited in claim 9, wherein said step (2) includes supplying fuel to the combustor at a fuel flow rate profile substantially equivalent to an electrical power demand profile.

13. A method as recited in claim 9, wherein said step (2) includes supplying fuel to the combustor in step increments to maintain the fixed geometry high pressure spool at the constant speed.

14. A method as recited in claim 9, wherein said step (2) includes supplying fuel to the combustor in step increments in response to a step incremental change in an electrical power demand.

15. A method as recited in claim 9, wherein said step (3) further comprises
   driving the fixed geometry low pressure turbine with a fluid flow from the axial high pressure turbine.

* * * * *